United States Patent [19]

Kraft et al.

[11] 3,970,733
[45] July 20, 1976

[54] METHOD OF MAKING AN ENCAPSULATED CHAIN

[75] Inventors: Louis Seelbach Kraft, Stow; Thomas E. Burkley, Akron, both of Ohio

[73] Assignee: The Goodyear Tire & Rubber Company, Akron, Ohio

[22] Filed: Apr. 16, 1971

[21] Appl. No.: 134,595

[52] U.S. Cl. .............................. 264/135; 264/263; 264/264; 264/273
[51] Int. Cl.² ............................................ B29D 3/00
[58] Field of Search .......... 264/265, 130, 135, 273, 264/263, 264

[56] References Cited
UNITED STATES PATENTS

| | | | |
|---|---|---|---|
| 2,110,226 | 3/1938 | Hill | 264/242 |
| 2,983,964 | 5/1961 | Vocht | 264/135 |
| 3,274,320 | 9/1966 | Reber | 264/135 |
| 3,352,955 | 11/1967 | Pigott et al. | 264/135 |
| 3,415,924 | 12/1968 | Girardi | 264/229 |
| 3,539,671 | 11/1970 | Nauta | 264/265 |

Primary Examiner—Robert F. White
Assistant Examiner—T. E. Balhoff
Attorney, Agent, or Firm—F. W. Brunner; J. D. Wolfe

[57] ABSTRACT

An elastomeric encapsulated chain wherein the individual links of the chain are covered with an elastomer suitably of polyurethane and in one embodiment the individual links of the chain are separated by a plug of elastomer to permit the chain to be pulled under tension to compress the elastomer plug.

2 Claims, 3 Drawing Figures

U.S. Patent  July 20, 1976  3,970,733

METHOD OF MAKING AN ENCAPSULATED CHAIN

This invention relates to an elastomeric encapsulated chain and the method of encapsulation. More particularly, this invention relates to an elastomeric encapsulated chain that exhibits a certain degree of elongation under tension.

One of the defects of chains is that the links of the chain tend to become entangled. Also, when the chain is put under tension it tends to fail rather than to elongate or give. Also, the chain has no rigid aspect and thus is difficult to handle in certain situations.

An object of this invention is to provide a chain which is less prone to become entangled with use and also tends to reduce the shock as the chain is put under tension.

Figure 1:
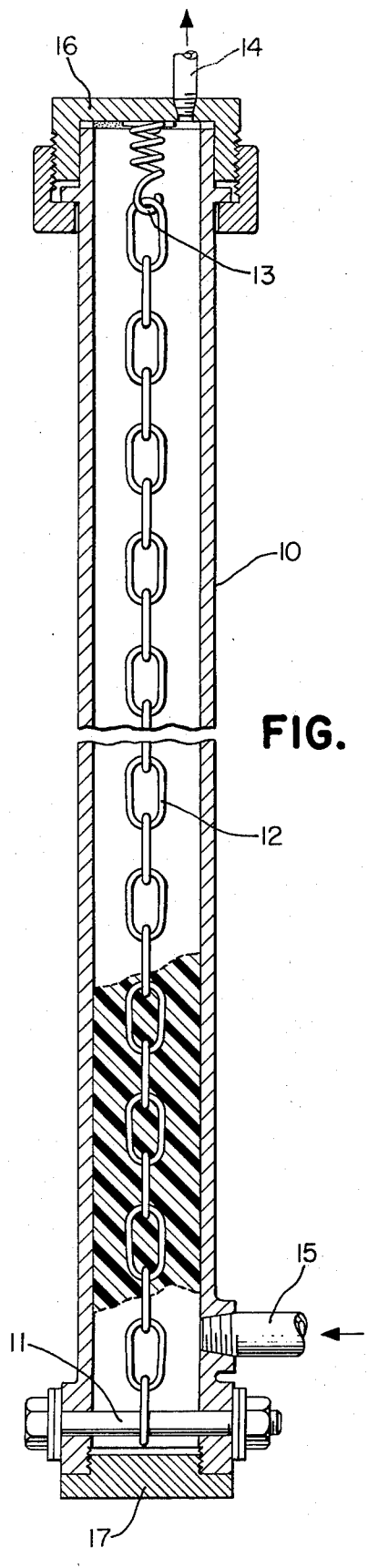
Figure 2:
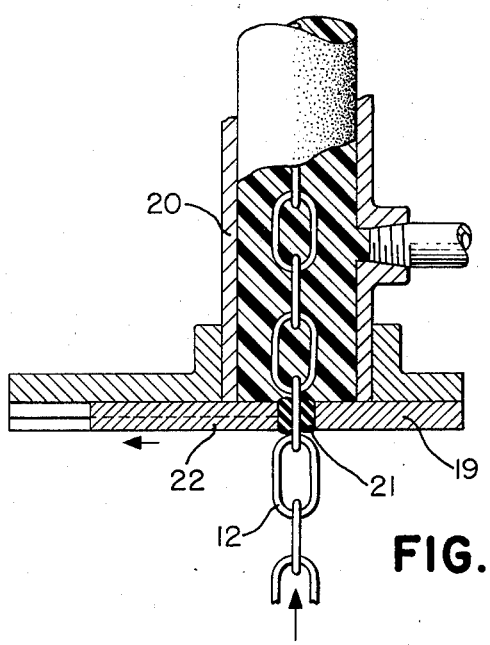
Figure 3:
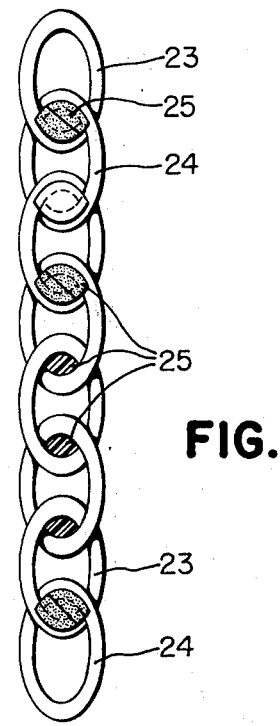

The nature of the above object and its advantages may be more readily understood by reference to the drawing wherein FIG. 1 is an elevational view in partial section of an apparatus suitable for encapsulating a chain;

FIG. 2 is a modified embodiment showing in detail a mechanism for sealing the chamber around the chain to permit a vacuum to be placed on said chamber; and FIG. 3 is a specific embodiment of the chain encapsulated in an elastomeric material.

Referring specifically to FIG. 1, numeral 10 indicates an elongated cylindrical vessel having a bolt 11 in the bottom thereof to which a chain 12 is attached and suspended from the top of the member by the hook 13 and 14 is an opening attached to a vacuum line to facilitate removing air and thus reducing air entrappment. An opening 15 is used to pump the polyurethane or other elastomeric encapsulating material into the bottom of the cylinder 10. With the chain 12 suspended in the chamber in the manner shown in FIG. 1 a suitable liquid encapsulating material is forced through opening 15 into the bottom of the chamber 10 while a vacuum is placed on the chamber by means of a vacuum pump not shown and having connections to line 14. The temperature or other conditions are adjusted whereby the encapsulating material congeals and becomes secured to or surrounds the chain and then the chain is removed from the chamber by removal of the end plates 16 or 17 of the chamber.

It should be understood that this method of encapsulation is sufficient for encapsulating only a short piece of chain. On the other hand, if a continuous length of chain is desired to be encapsulated, it is preferred that the end plates 16 and 17 be modified in the manner shown in FIG. 2. In this manner the end plate 19 is sealed to the side of the cylinder 20 suitably by welding and contains a suitable gasket 21 as shown in FIG. 2. The other part of the end plate 22 preferably slides into engagement with end plate 19 to grip the chain in the manner shown in FIG. 2. Where this is to be done in a continuous manner it would be desirable that the end plate 22 be attached to a hydraulic means whereby it could be moved into and out of engagement with end plate 19 to achieve the degree of sealing desired by the gasket 21.

In a preferred embodiment of this invention as is more readily seen in FIG. 3 the individual lengths 23 and 24 of the chain are not in actual contact but are encapsulated in such a manner that between the chain links there is a plug of elastomeric material 25. Thus, when the chain is placed under tension the plug of elastomeric material 25 would first be compressed and thus permit the chain to be slightly extensible to thereby reduce the shock as all the tension is applied to the chain.

It should be noted that a chain of the type shown in FIG. 3, i.e., one where the chain was encapsulated in full or partial compression would be useful to absorb part of the shock of an impact before a body was put under full tension as where the chain is used in lieu of an airplane arrestor belt or as a tow chain.

The nature of this invention also is illustrated in the following illustrative examples wherein all parts and percentages are by weight unless otherwise illustrated.

EXAMPLE I

A galvanized chain was suspended in a chamber of the type shown in the drawings. Then the chamber and chain were coated with a spray coat of a hexane solution of polyethylene to serve as a release agent and warmed to remove the solvent. The chamber was evacuated to above 700 milliliters of mercury or more.

The evacuated chamber was filled through the opening 15 to approximately the bottom of the hook 13 with a liquid polyurethane reaction mixture and allowed to set and cure. Then the encapsulated chain was removed from the chamber and cured in an air oven for several hours at 150°F.

The liquid polyurethane reaction mixture was a mixture of a methylene dichloroaniline (MOCA) and a prepolymer of ethylene-propylene adipate with toluene diisocyanate.

The polyurethane elastomer in the above encapsulated chain was not adhered to links of the chain but if the mold release agent was omitted then the polyurethane would be adhered to the chain links. Also, the mold release agent such as a wax or polyethylene is applied to coat the walls of the cylinder 10, the end plates 16 and 17, the back 13 and belt 11 to prevent the encapsulation compound from adhering thereto.

The chain can be encapsulated in the encapsulation agent to give a coating substantially the same as the diameter of the cylinder. In an alternate system the coating is a ¼ to ½ inch thick and is applied by spraying or dipping.

Any of the solvent polyurethanes or the liquid polyurethane reaction mixtures can be used as the encapsulation agent. The solvent polyurethanes are those well known and readily soluble in methyl ethyl ketone and/or dimethylformamide and relative solvents.

The liquid polyurethane reaction mixtures are made by either a prepolymer or one shot technique from a reactive hydrogen containing material of 1000 to 5000 molecular weight such as the polyether polyols, polyester polyols, an organic polyisocyanate such as toluene diisocyanate or methylene di(phenyl isocyanate) and a crosslinker such as a low molecular weight polyol, i.e., less than 800 molecular weight and an organic diamine. Normally the organic polyisocyanate is used in excess relative to the reactive hydrogen containing material, the preferred molar ratio being about 1.3/3.0 to 1. Also, the crosslinker is used in about 0.3 to 0.9 moles for each mole of excess organic polyisocyanate over the reactive hydrogen containing material.

The metal chains such as iron, steel, copper, aluminum and alloys can be encapsulated in the manner described above and thus also render the chain resistant to corrosion by certain chemicals. Where resistance to salt water corrosion is desired, it is preferred that the polyurethane be of the polyether type, where polyols of di- or triol of polypropylene ether or polytetramethylene ether are used with the crosslinker being MOCA, or a diamine having 2 to 10 carbon atoms or the glycols of 2 to 10 carbon atoms.

In Example I the chain was coated with a release agent to permit the encapsulated material to move to a restricted degree independent of the movement of the chain. In other instances it is desirable to omit the release agent and treat the chain with a special bonding agent such as an epoxy resin containing a curative of the acid, amine or polyamide types to enhance the bonding of the encapsulating material to the chain and thus cause the chain to act as a unitary material. This specific embodiment is illustrated in Example II.

EXAMPLE II

A steel chain of the link type is suspended in the encapsulation apparatus with each link spaced apart approximately one-quarter of an inch with a polyurethane elastomeric spacer. Then the chain is coated with a hexane solution of an epoxy resin, such as Epon 828, and an amine curative. The solvent is allowed to evaporate before the chain is encapsulated with a liquid polyetherurethane reaction mixture to obtain an encapsulated chain wherein the polyurethane is adhered tightly to the chain.

The liquid polyetherurethane reaction mixture preferably is a mixture of a polytetramethylene ether glycol, toluene diisocyanate and methylene diorthochloroaniline in a small amount, 10 to 20 percent by weight of a hydrocarbon solvent.

While certain representative embodiments and details have been shown for the purpose of illustrating the invention, it will be apparent to those skilled in this art that various changes and modifications may be made therein without departing from the spirit or scope of the invention.

What is claimed is:

1. A method of encapsulating a metal chain consisting suspending the chain in an elongated chamber, said chain having spacers positioned between each link thereof, coating the surface of the chamber with a release agent, and then filling the chamber under reduced pressure with an encapsulating agent to cover the links and spacers, reacting the encapsulating agent to give the chain an elastomeric coating.

2. A method of encapsulating a metal chain consisting suspending the chain in an elongated chamber, said chain being first coated with a release agent prior to encapsulation, coating the surface of the chamber with a release agent, and then filling the chamber under reduced pressure with an encapsulating agent, reacting the encapsulating agent to give the chain an elastomeric coating.

* * * * *